V. WHITE.
AUTOMATIC CONTROL MECHANISM.
APPLICATION FILED APR. 15, 1918.

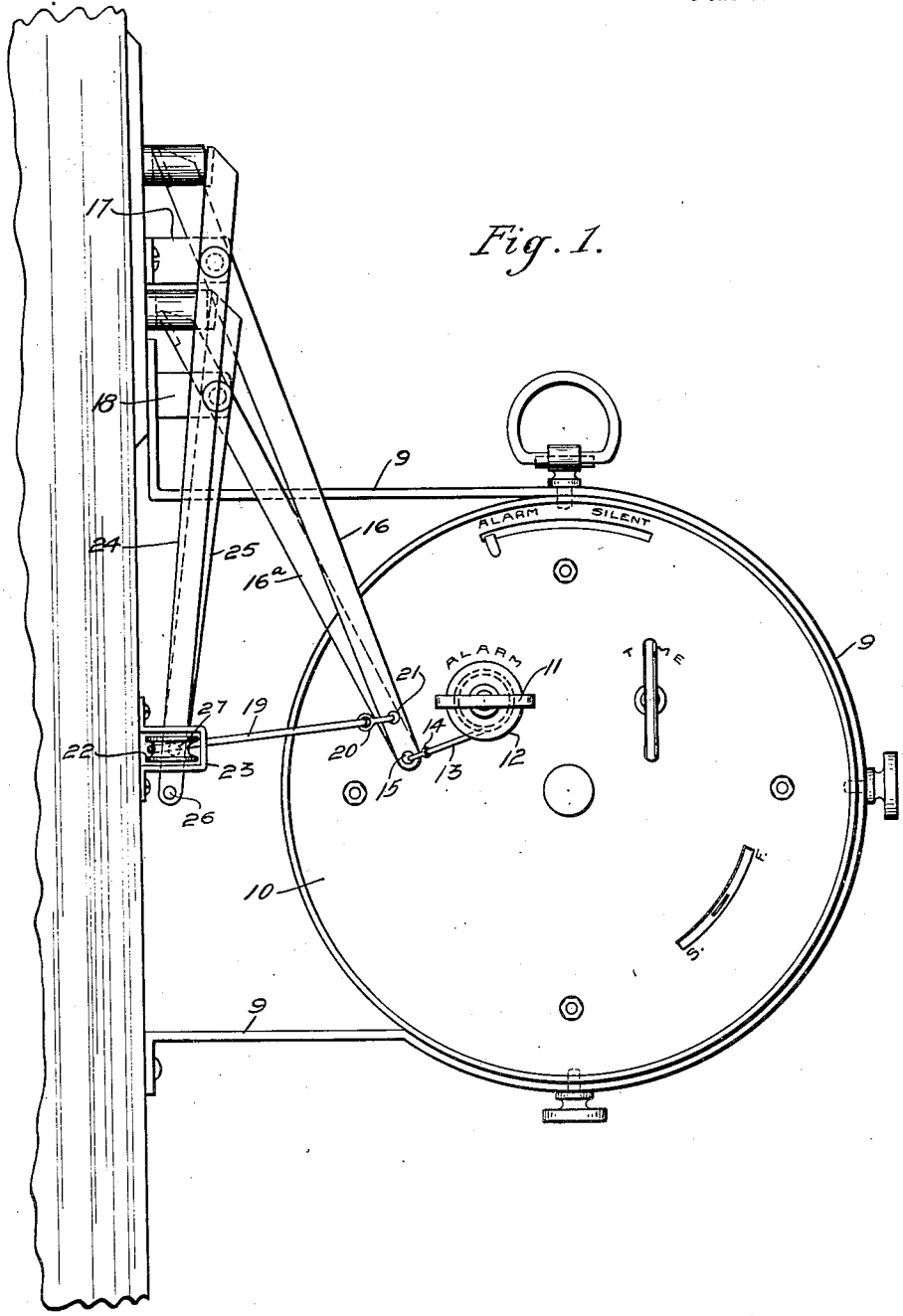

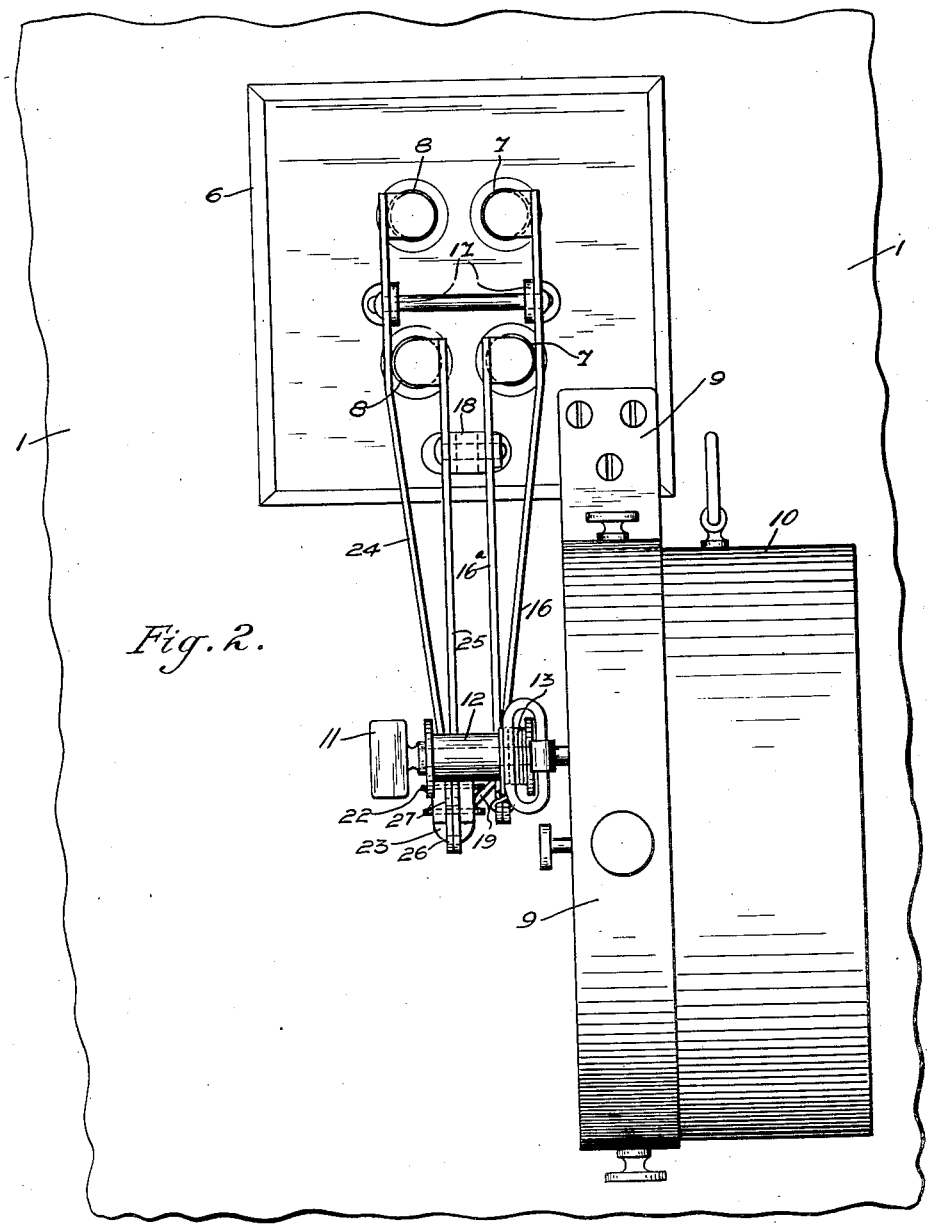

1,292,189.

Patented Jan. 21, 1919.
3 SHEETS—SHEET 3.

Witnesses

Inventor
V. White
By
Atty.

UNITED STATES PATENT OFFICE.

VICTOR WHITE, OF EVANSTON, ILLINOIS.

AUTOMATIC CONTROL MECHANISM.

1,292,189.  Specification of Letters Patent.  Patented Jan. 21, 1919.

Application filed April 15, 1918. Serial No. 228,601.

*To all whom it may concern:*

Be it known that I, VICTOR WHITE, a citizen of the United States, residing at Evanston, in the county of Cook and State of Illinois, have invented certain new and useful Improvements in Automatic Control Mechanism, of which the following is a specification.

This invention relates to improvements in automatic control mechanism. One object is to provide means whereby the lights and heating plant of a building may be automatically controlled, the lights being automatically lighted or extinguished at a predetermined time and simultaneously therewith the draft in the heating plant turned off and the damper opened in similar manner. A further object is to provide mechanism of this class that is very simple in construction, of few parts, cheap to manufacture, positive and efficient in operation, not liable to get out of repair and that will operate with the minimum attention.

With the foregoing and other objects in view the invention consists in the combination and arrangement of parts to be hereinafter fully described, pointed out in the appended claims and illustrated in the accompanying drawings which form a part of this specification and in which—

Figure 1 is a view of a portion of my mechanism in elevation illustrating its application.

Fig. 2 is a front view of Fig. 1.

Like reference characters denote corresponding parts throughout the several views.

Figure 4:
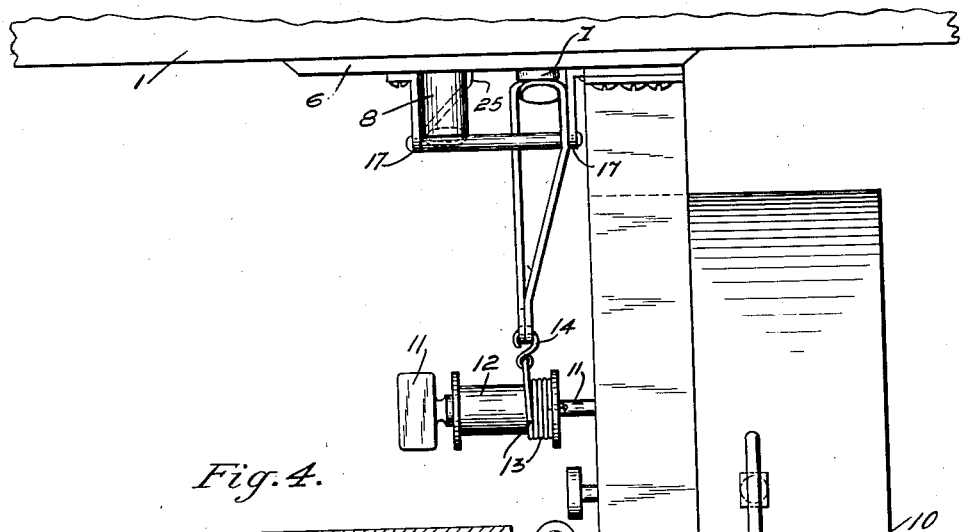
Fig. 4 is a view of the complete mechanism illustrating its application to a system of lights and to a heating plant in a building.
Figure 3:
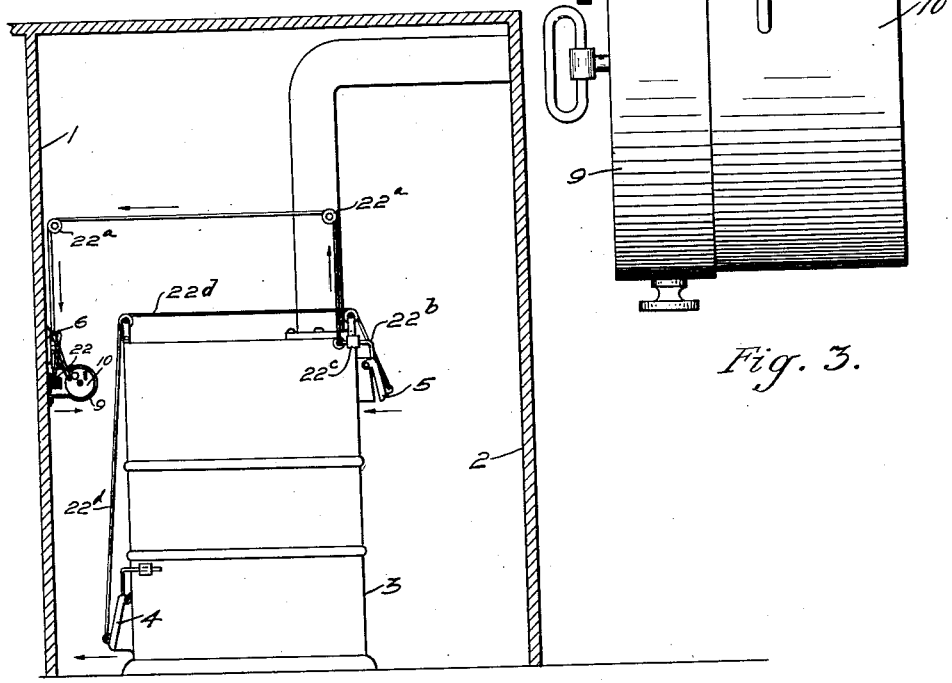
Fig. 3 is a top plan view of Fig. 1.

The reference numerals 1, 2 denote the walls of a room or building; 3 a furnace in the building provided with the usual draft door 4 and damper 5. To the wall 1 the usual switch block 6 for the lights is secured and the same is provided with the two pair of push buttons 7, 8 which are operatively connected to the lights (not shown). When the buttons 7 are depressed the buttons 8 are protruded and the lights are out. When the buttons 7 protrude the buttons 8 are depressed and the lights are on. These electric push buttons are the well known type found in all electrically lighted buildings.

To the block 6 and wall 1 I secure a bracket 9 that carries the alarm clock 10, the alarm shaft 11 of which is provided with the drum 12 to which a cord 13 is secured and which may be wound thereupon. One end of the cord 13 is provided with a hook 14 which is adapted to be secured in the alined perforations 15 of the levers 16, 16$^a$ which are fulcrumed, respectively, in the bearings 17, 18 carried by the said switch block 6. One end of the said lever 16 is capable of engagement with one button 7 and one end of lever 16$^a$ for engagement with the other button 7 to depress the same. Another cord 19 is provided with a hook 20 for engagement with the alined perforations 21 of the said levers 16, 16$^a$, the other end of said cord 19 passing over a guide 22 journaled in a bearing 23 secured to the said wall 1 and over other suitable guides 22$^a$ to the arm 22$^b$ of damper 5 which arm carries the usual counterbalance weight 22$^c$. The damper 5 and draft door 4 are connected by a cord 22$^d$ so that closing the damper 5 opens the draft door 4 and vice versa. To the bearings 17, 18 aforesaid I secure another pair of levers 24, 25 similar in all respects to the levers 16, 16$^a$ except that said levers 24, 25 are adapted for engagement with the buttons 8 to depress the same. The said levers are formed with alined openings 26 and with alined openings 27, the former being adapted to receive the hook 14 and the latter being adapted to receive the hook 20, said hooks 14, 20 being shown in Fig. 1 in engagement with the levers 16, 16$^a$. Either pair of levers may be operated to depress either pair of buttons in the manner now to be described.

In Fig. 1 the alarm has gone off and the levers 16, 16$^a$ have depressed the buttons 7 thus throwing off the lights, closing damper 5 and opening draft door 4. To re-set the mechanism for the next operation which will be to throw the lights on, close the draft door 4 and open the damper 5, the cord 13 will be unwound from the drum 12 and the hook 14 then placed in the alined perforations 26 in the levers 24, 25 and the hook 20 will be placed in the alined perforations 27. The alarm is now set for a certain hour in the usual manner. When the alarm goes off the cord 13 will again be wound upon the drum 12, the cord 19 drawn toward the drum 12 over guide 22 and the levers 24, 25 raised thus depressing the buttons 8 and turning the lights on, closing draft door 4 and opening damper 5.

What is claimed is:—

1. In automatic control mechanism the combination with a switch block provided with two pair of push buttons, of two pair of levers fulcrumed upon said switch block for engagement with the said push buttons, a time motor adapted for operative engagement with either pair of levers, a flexible element having work-engaging terminals, and means connecting said flexible element and either pair of levers whereby movement of the latter may cause simultaneous movement of said flexible element.

2. In automatic control mechanism the combination with a switch block provided with two pair of push buttons, of two pair of alternately operating levers fulcrumed upon said switch block for engagement with said push buttons, a time motor adapted for operative connection with either pair of levers, a flexible element having work-engaging terminals, and means connecting said flexible element and either pair of levers whereby movement of the latter may cause movement of said flexible element.

3. In automatic control mechanism the combination with a switch block provided with two pair of push buttons, of two pair of alternately operating levers fulcrumed upon said switch block for engagement with said push buttons, a time motor, a rotary drum for said time motor, a flexible element adapted to connect said rotary drum to either pair of levers, a second flexible element, and means connecting said flexible element and either pair of levers whereby movement of the latter may be transmitted to said second flexible element.

In testimony that I claim the foregoing as my own I have hereto affixed my signature in the presence of two subscribing witnesses.

VICTOR WHITE.

Witnesses:
M. L. HARRISON,
H. REINSHAGEN.